Dec. 24, 1957 W. M. OSBORN 2,817,320
HYDRAULICALLY OPERATED TRANSMISSION, ETC
Filed Sept. 21, 1953 2 Sheets-Sheet 1
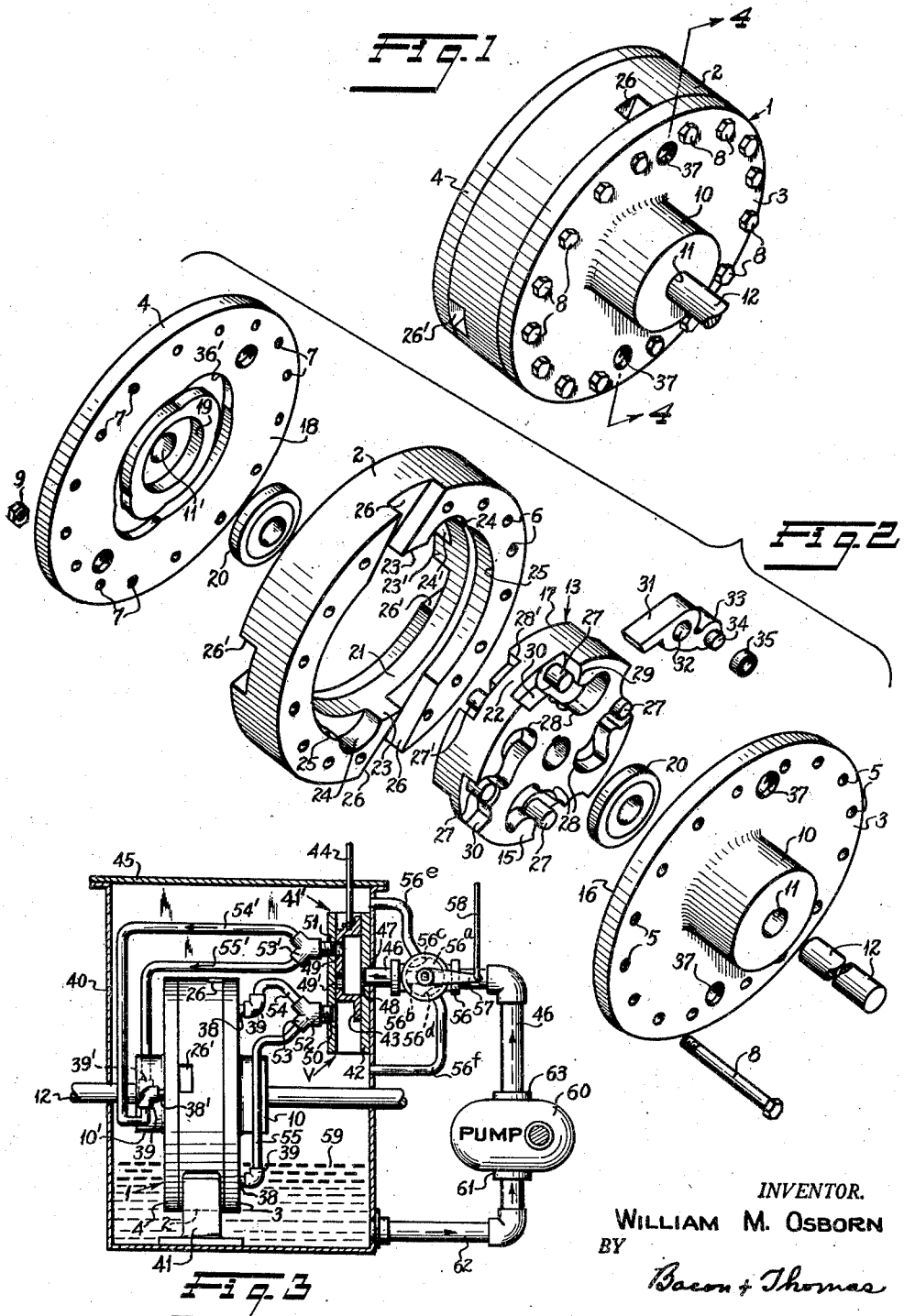
INVENTOR.
WILLIAM M. OSBORN
BY
Bacon & Thomas
ATTORNEYS Dec. 24, 1957 W. M. OSBORN 2,817,320
HYDRAULICALLY OPERATED TRANSMISSION, ETC
Filed Sept. 21, 1953
2 Sheets-Sheet 2
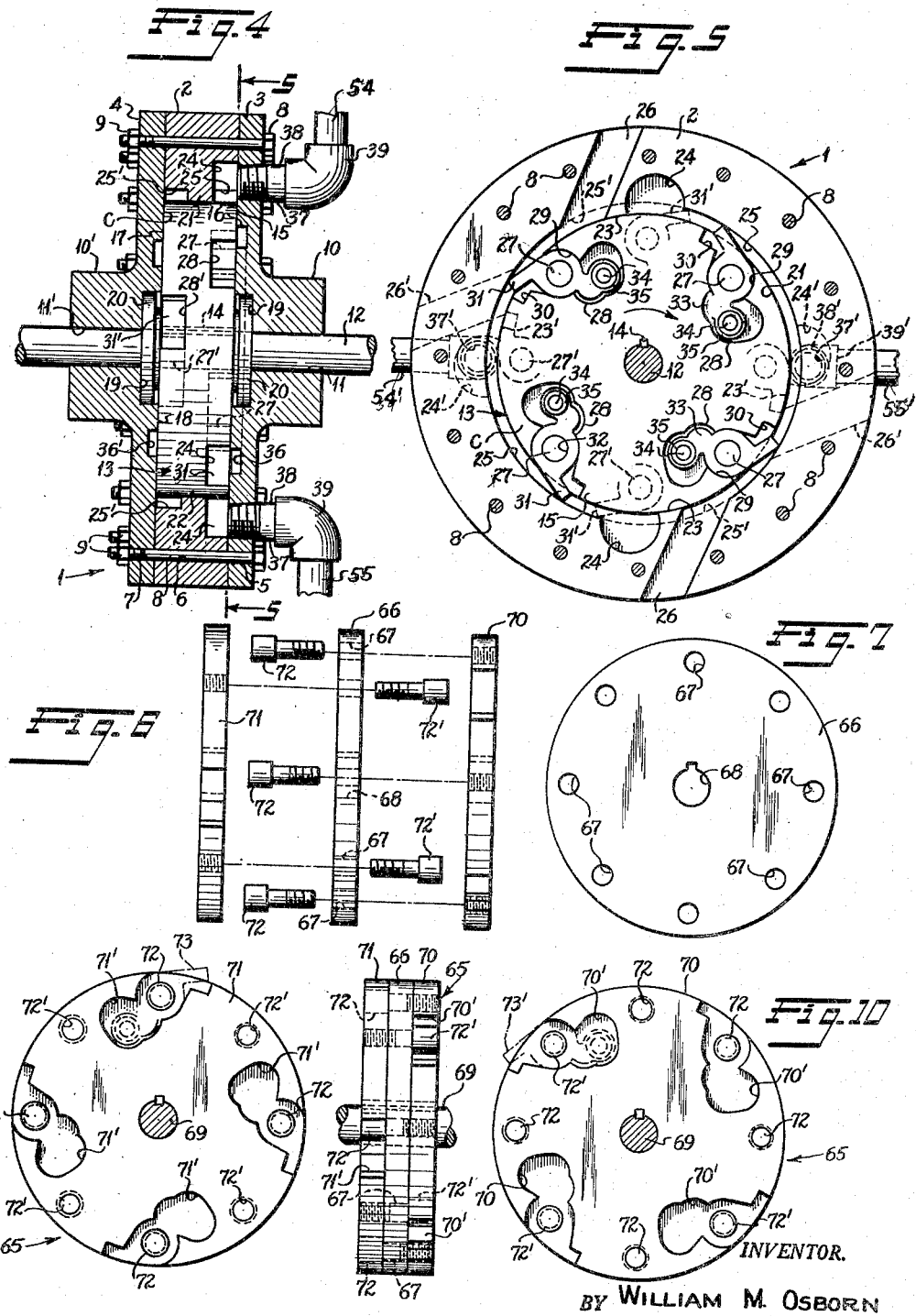
INVENTOR.
BY WILLIAM M. OSBORN
Bacon + Thomas
ATTORNEYS United States Patent Office 2,817,320
Patented Dec. 24, 1957

2,817,320
HYDRAULICALLY OPERATED TRANSMISSION, ETC.
William M. Osborn, Denver, Colo.

Application September 21, 1953, Serial No. 381,411

14 Claims. (Cl. 121—93)

The present invention relates to an improved hydraulically operated unit adapted for various uses, such as a positive power transmitting means, a brake, an infinitely variable speed motor, a combined transmission and brake, etc.

More specifically, the invention relates to a device of the character referred to above which is highly efficient, has a minimum number of parts, and operates substantially free of friction.

The invention further relates to a hydraulic power transmitting system for motor vehicles and the like and to control means for such system.

The principal object of the invention is to provide a hydraulically operated device of the character described which, when used as a power transmitting unit, or a motor, can be selectively driven either in a forward or in a reverse direction.

Another object is to provide a hydraulically operated unit of the character described which includes a minimum number of parts constructed so as to be interchangeably assembled.

Another object is to provide a hydraulically operated device including a rotor with pivoted vanes, and wherein the vanes are controlled at all times to assure a positive drive of the device; the vanes being controlled in the present device by providing each vane with a cam follower and providing cam tracks to receive said followers.

Another object is to provide a hydraulically operated device wherein the necessity for employing packing means between the stationary and rotary parts is eliminated without any substantial loss in efficiency, notwithstanding the fact that the housing may be caused to expand slightly by the pressure of the operating fluid.

A more specific object is to provide a power transmitting unit adapted to be used in a hydraulic transmission system in a motor vehicle in lieu of conventional gear, fluid coupling, or torque converter types of transmissions. In this connection, the present unit is such that it will not cause the vehicle to "creep," which is a common fault of the latter two types of tarnsmissions.

Still another object is to provide a hydraulic transmission system for a motor vehicle in which the driving unit is constructed and associated with control means in such manner that the unit can be caused to act as a brake for the vehicle.

A further object is to provide a rotor for use in a hydraulically operated device, such as disclosed herein, which can be made in one-piece, or of a laminated plate construction to simplify manufacture and reduce costs of production.

Other objects and features of the invention will be apparent from the following description taken in conjunction with the accompanying drawings, in which:

Fig. 1 is a perspective view of a hydraulically operated unit embodying the principles of the present invention;

Fig. 2 is an exploded perspective view illustrating the various individual parts comprising the unit shown in Fig. 1;

Fig. 3 is a diagrammatic view illustrating the unit connected in a system adapting the same to serve as a transmission for a motor vehicle;

Fig. 4 is a vertical sectional view through the unit taken on the line 4—4 of Fig. 1, but omitting the cam followers on the rotor vanes in the interest of clarity;

Fig. 5 is a vertical sectional view taken on the line 5—5 of Fig. 4 and showing one face of the rotor in elevation;

Fig. 6 is a diagrammatic view illustrating the components of a modified, laminated form of rotor adapted to be used in the unit disclosed in Figs. 2, 4 and 5 in lieu of the one-piece rotor disclosed therein;

Fig. 7 is a side elevational view of the central plate of the modified rotor of Fig. 6;

Fig. 8 is an end elevational view illustrating the parts of Fig. 6 in completely assembled relation;

Fig. 9 is a left side elevational view of the rotor shown in Fig. 8; and

Fig. 10 is a right side elevational view of the rotor shown in Fig. 8.

Referring now to Figs. 1, 2, 4 and 5, the hydraulic unit is generally identified by the numeral 1 and comprises a housing including a central annular housing section or member 2 and identical, interchangeable, end housing plates or sections 3 and 4. The end plate 3 is provided with a series of openings 5 and the central member 2 and the other end plate 4 are provided with similar registering openings 6 and 7, respectively. The bolts 8 extend through the openings 5, 6 and 7 and nuts 9 are threaded on the ends of the bolts to secure the central member 2 and the end plates 3 and 4 in assembled relation. It is to be understood that the engaging faces of the central member 2 and the end plates 3 and 4 are machined so smoothly and pulled up as tightly that no packing means need be disposed therebetween.

The end plate 3 is preferably made of bronze and has a hub portion 10 extending outwardly therefrom and provided with an opening 11, which serves as a journal for a shaft 12. The end plate 4 is also preferably made of bronze and is provided with a similar hub 10' having a similar opening 11' for the shaft 12. The end plates 3 and 4 and the central housing member 2 cooperate to provide a chamber C for a one-piece rotor 13. The rotor 13 is preferably made of bronze and is mounted on the shaft 12 in concentric relation with the annular housing member 2 and lies between the end plates 3 and 4. A conventional key 14 secures the rotor to the shaft 12.

The rotor 13 has a side face 15 disposed in confronting relation with the inner face 16 of the end plate 3, and another side face 17 in confronting relation with the inner face 18 of the end plate 4. Each of the end plate faces 16 and 18 is counterbored as indicated at 19 for the reception of a conventional ball thrust bearing 20, which has engagement with the adjacent faces 15 and 17 of the rotor 13. The clearance between the faces 15—16 and 17—18 is very small, only a matter of about one thousandth of an inch, or just enough to provide sufficient clearance to maintain a lubricating oil film. Moreover, the counterbores 19 are made of such depth that the thrust bearings 20 are preloaded to the extent of about 30 to 50 pounds as the housing parts are tightly drawn up by the bolts 8. In addition, the bearings 20 have a fit relative to the counterbores 19 and the shaft 12 such that no sealing means for the shaft is necessary and the only tolerance provided is such as will facilitate the formation of an oil film to lubricate the shaft 12 in the housing hub portions 10 and 10'.

The annular housing member 2 is preferably made of aluminum alloy and has an inwardly extending rib portion 21, Fig. 4, of an axial dimension equal to about one-third the width of the member 2. The rotor 13 has an uninterrupted peripheral portion 22 disposed centrally thereof of a similar width so that the rib 21 and central portion 22 are disposed in confronting relation. The portions 21 and 22 are finished to a close tolerance, only sufficient to provide a running fit and permit the formation of an oil lubricating film therebetween.

The rib 21 has a pair of diametrically opposed lateral extensions 23 of narrow circumferential dimension extending therefrom towards the end plate 3 and a pair of similar lateral extensions 23' extending toward the end plate 4. The extensions 23 are located adjacent inlet pockets 24 formed in one face of the member 2, which merge with counterbored portions 25 that are defined in part by the rib 21. These counterbored portions 25 function as working chambers for the rotor vanes, as will be described later. The counterbored portions 25 have their origin adjacent the inlet pockets 24 and terminate in exhaust ports 26. The axial dimension of the inlet pockets 24 and counterbored portions 25 is substantially equal to that of the rib 21, or in other words, equal to about one-third the overall axial dimension of the member 2. Thus, the central housing member 2 has, on one side of the rib 21, a pair of inlet pockets 24 and a pair of exhaust pockets 26 separated by the lateral extensions 23, as is clearly shown in Fig. 5.

The lateral extensions 23' are disposed upon the opposite side of the rib 21 and are associated with similar inlet pockets 24', counterbores 25', and exhaust ports 26'. As will be apparent from Fig. 4, the width of the counterbores 25' is the same as that of the counterbores 25. It will be particularly noted from Fig. 5 that the exhaust ports 26 and 26', formed in the opposite faces of the central housing member 2, are relatively off-set from each other on an angle of about 90 degrees and that the inlet pockets 24 and 24' are correspondingly off-set.

In the form of the invention illustrated in Figs. 2, 4 and 5, the body of the rotor 13 is shown as formed in one piece, although it is contemplated that the rotor may be made of a plurality of flat plate sections, as shown in Figs. 6 to 10, inclusive, to be described later. With particular reference to Figs. 2, 4 and 5, the face 15 of the rotor 13 is hollow milled to provide a plurality of projecting studs 27 and further milled to provide recesses 28 having the configuration illustrated. It will be noted that the recesses 28 extend inwardly from the face 15 and open into the outer periphery of the rotor 13. It will also be noted that the studs 27 are of a height equal to the depth of the recesses 28. The opposite face 17 of the rotor 13 is similarly milled to provide projecting studs 27' and recesses 28'. The latter recesses, however, extend in a reverse direction from that of the recesses 28, although they will extend in the same direction if only a unidirectional drive should be desired. Each of the recesses 28 includes an arcuate abutment portion 29, which is concentric with the stud 27, and further includes a notch 30 disposed upon the opposite side of said stud. The recesses 27' have abutments and notches similar to the abutments 29 and notches 30.

A vane or blade 31 is pivotally mounted upon each of the studs 27, and a similar vane or blade 31' is mounted upon each of the studs 27'. It will be noted from Fig. 5 that the blades 31 and 31' extend in opposite directions. Moreover, the blades 31 and 31' are interchangeable and each has an opening 32 to receive its associated stud 27 or 27'. Each of the blades 31 and 31' is also provided with a tail or extension 33 having a stud 34 projecting laterally therefrom. The blades 31 and 31' are preferably made of bronze and the studs 34 may consist of an integral projection, or a separate pin mounted in the tail portion 33. A conventional ball bearing 35 is mounted upon each of the studs 34. The ball bearings 35 function as cam followers; those mounted upon the blades 31 are received in a cam track 36 (Fig. 4) formed in the inner face 16 of the end plate 3, and those carried by the blades 31' are received in a similar cam track 36' (Figs. 1 and 4) formed in the inner face 18 of the end plate 4. The cam tracks 36 and 36' control the disposition of the blades 31 and 31' at all times so that when operating fluid (oil under pressure) acts upon said blades adequate torque is developed to positively turn the rotor 13.

The end plate 3 has diametrically disposed inlet openings 37 that register with the inlet pockets 24 of the central housing member 2, as is best illustrated in Fig. 4. The end plate 4 has similar openings 37', Fig. 5, which register with the inlet pockets 24'. The openings 37 and $37_2$ constitute means for selectively admitting operating fluid under pressure into the unit 1 through either of the housing end plates 3 and 4, depending upon the direction in which it is desired to drive the rotor 13. The operating fluid may be conducted to the openings 37 and 37' through any suitable means, such as shown in Figs. 3 to 5. Thus, a pipe nipple 38 is mounted in each of the openings 37 and has a conventional elbow 39 connected thereto. Similar pipe nipples 38' and elbows 39' are associated with the openings 37'.

When the unit 1 is used as a transmission (or as a motor) it is preferably mounted within a casing 40 (Fig. 3). In such instance, the housing of the unit 1 is mounted within the casing 40 on a saddle 41 to prevent the same from turning relative to said casing. The control means for the unit 1 is diagrammatically illustrated and generally identified by the numeral 41' and comprises a fluid distribution valve V, that is preferably mounted within the casing 40. The fluid distribution valve V includes a hollow body 42 containing a D-type slide valve 43 having an operating rod 44 connected to the upper end thereof and projecting through the casing cover 45. A supply pipe 46 extends through an opening 47 in the side wall of the casing 40 and is mounted in a threaded opening 48 in the valve body 42, so that it communicates with the interior of said valve body and with the interior of the slide valve 43. The slide valve 43 has ports 49' and 49 adapted to be selectively placed in registration with ports 50 and 51, respectively, formed in the body 42. A conventional pipe nipple 52 is mounted in the port 50 and has a Y-fitting 53 connected thereto. Conduits 54 and 55 connect the branches of Y-fitting 53 to the elbows 39. A similar Y-fitting 53' communicates with the port 51, and conduits 54' and 55' connect the branches of said Y-fitting with the elbows 39'. Thus, when the slide valve 43 is in the position illustrated in Fig. 3, the port 49' thereof registers with the port 51 so that operating fluid under pressure can then flow through the conduits 54' and 55' to the inlet pockets 24' of the central housing member 2. On the other hand, when the slide valve 43 is moved downwardly as viewed in Fig. 3, to establish communication between the valve port 49 and the housing port 50, operating fluid under pressure will flow through the conduits 54 and 55 to the inlet pockets 24 on the opposite side of the housing member 2.

It will be noted from Fig. 3 that when the port 49 of the valve 43 is in registration with the port 51, the port 50 is unobstructed or open to exhaust. Likewise, when the ports 49' and 50 are in registration, the port 51 is unobstructed or open to exhaust. Therefore, when operating fluid under pressure is supplied to the inlet pockets at one side of the unit, the inlet pockets at the opposite side of the unit are opened to exhaust and the unit cannot become "locked." In the event that any operating fluid works its way between the rotor portion 22 and housing rib 21 as a lubricating film while the unit is in operation, it will merely discharge to exhaust from the side of the unit which is open to exhaust. It will also be observed that the exhaust ports 26 and 26' of the unit 1 open directly into the casing 40, so that such fluid can discharge through such exhaust ports.

The rate at which operating fluid is supplied to the unit 1 is controlled by a valve 56 connected in the pipe 46. The valve 46 is of the rotary type actuated by a lever 57 having an operating rod 58 connected thereto.

The lever 57 is connected with a core 56a disposed in the body of the valve 56, said core having a diametrically extending port 56b and arcuate ports 56c and 56d. The port 56b normally controls the rate of flow of operating fluid through the valve 56; whereas, the ports 56c and 56d are provided for instances where it is desired to also use the unit 1 as a brake, as will be explained more fully hereinafter. A by-pass conduit 56e connects the port 56c with the interior of the casing 40 and another by-pass conduit 56f connects the port 56d with the interior of said casing. The function and purpose of the by-pass conduits 56e and 56f will also be explained later.

The casing 40 forms a reservoir or sump for the operating fluid, preferably a good grade of lubricating oil 59. A conventional pump 60, adapted to be driven from a vehicle engine or any other means (not shown), has its inlet side 61 connected with the lower portion of the casing 40 by a pipe 62. The outlet 63 of the pump 60 is connected with the pipe 46, previously referred to. The pump 60 is preferably of the type which has a built-in by-pass, so that oil can be by-passed instead of being delivered into the pipe 46 when the valve 56 is closed. The oil 59 within the casing 40 is, of course, under atmospheric pressure so that spent operating fluid discharged from the exhaust ports 26 or 26' of the unit 1 can readily collect in said casing.

Fig. 5 illustrates the relative position of the vanes 31 when operating fluid under pressure is supplied to the pockets 24 and working chambers 25. The shape of the cam track 36 is such that the free end of the vanes 31 are moved outwardly into positive engagement with the inner peripheral surface of the chambers 25 as soon as the vanes assume a position adjacent the leading ends of said pockets, i. e., pass the lateral extensions 23. With the vanes 31 in such position, the operating fluid is effective thereon to cause the rotor 13 to turn clockwise as viewed in Fig. 5. The vanes 31 remain in their extended active position until they assume a position opposite the exhaust ports 26, whereupon they are positively retracted by the cam track 36 to pass the lateral extensions 23 although they remain in contact therewith to form a seal as they move across the same. The clearance between the studs 27 and the openings 32 in the vanes 31 is such that the vanes 31 engage the abutments 29 to transmit rotating torque thereto, so that the studs 27 are substantially relieved of all shearing stresses. This, of course, is conducive to minimum of wear between the studs 27 and vanes 31.

Since operating fluid under pressure is admitted at two diametrically spaced points, a very uniform and powerful torque is imparted to the rotor 13 which, in turn, transmits the same to the shaft 12. The close fit of the working parts makes it possible to operate the unit 1 with very high efficiency at comparatively low pressures. When the present unit is used as a transmission in a motor vehicle, for example, speeds of 70 miles an hour and higher can be readily obtained with pressures under two hundred pounds per square inch. Another advantage obtained with the present unit, using the same as a transmission, is that no slip occurs in the drive, so that immediately upon the admission of operating fluid into the unit, positive rotation of the rotor 13 occurs. A further advantage resides in the fact that the valve 56 can be adjusted so that the vehicle will not tend to "creep" at times when the vehicle is brought to a stop at a traffic light.

While the clearance between the rib 21 and the central portion 22 of the rotor 13 has been described as very slight, or only sufficient to provide for adequate lubrication, it will be apparent that no ill effects or detrimental action will occur in the event that any of the oil should leak between the rotor 13 and housing section 2, since the exhaust ports 26' will drain slight leakage, and the conduits 54' and 55' are open to exhaust at the time that operating fluid under pressure is being delivered to the unit through the conduits 54 and 55, and vice versa.

If it is assumed that the delivery of operating fluid through the conduits 54 and 55 effects forward drive of the vehicle, then, it will be apparent that upon shifting of the valve 43 to reverse the direction of flow of operating fluid, that is to say, to connect the conduits 54' and 55' to high pressure, and the conduits 54 and 55 to exhaust, the rotor 13 will be caused to rotate in a reverse direction in view of the reversed positions of the vanes 31'. It will be understood that the cam track 36' will then control the vanes 31' in the same manner that the cam track 36 controls the vanes 31. It will also be apparent that forward or reverse drive can be effected at any desired speed by manipulating the lever 57 of the valve 56 to control the rate at which operating fluid is supplied to the unit 1.

While the unit 1 has been described in detail as either a vehicle transmission or motor, it is equally obvious that the unit may be employed as an independent brake by connecting the rotor to the part whose rotation is to be retarded or controlled or used to brake the same shaft 12 which it drives, as in Fig. 3. The control or the extent of braking effect obtained will vary in accordance with the adjustment of the valve 56. Assuming that the shaft 12 is a vehicle propeller shaft whose rotation it is desired to retard, and assuming further that the shaft 12 normally rotates in a clockwise direction, as viewed in Fig. 5, then a braking effect can be applied to the shaft 12 by admitting a limited flow of operating fluid into the inlet pockets 24' to tend to reverse the direction of rotation of the rotor 13. To do this, the valve core 56a is adjusted by rotating the same counter-clockwise as viewed in Fig. 3 so that the port 56c establishes communication between the pipe 46 and the by-pass conduit 56e. Simultaneously, the port 56d will establish communication between the pipe 46 and the by-pass conduit 56f. The result of such adjustment of the valve 56 is that a portion of the fluid delivered by the pump 60 is by-passed by the port 56d and the conduit 56f to the casing 40. Further, the port 56b is preferably positioned so that the amount of operating fluid that can be delivered to the unit 1 is insufficient to instantly stop, or drive the rotor 13 in the opposite direction, but is sufficient to gradually retard rotation of the rotor 13 by the shaft 12, by requiring the vanes 31' to back the admitted fluid out of the unit 1 until the individual vanes pass the inlet pockets 24', whereupon sufficient fluid surges back into the unit to fill the working chambers to act against the next succeeding vanes 31' to retard their movement toward said inlet pockets. During the braking action some fluid will be continuously by-passed from the port 56b into the port 56c, depending upon the extent to which both register with the pipe 46.

The resistance offered to the backing out of the fluid can be regulated by adjustment of the lever 57 so that the braking effect can be gradually applied and increased or decreased, as desired, until the turning effort of the shaft 12 has been completely overcome.

One of the highly important features of unit 1, when used as a brake, is that it can exert a braking effect in either direction. Thus, if the shaft 12 were rotating counter-clockwise, or in a direction opposite to that assumed hereinbefore, it would only be necessary to shift the slide valve 43 to admit operating fluid into the inlet pockets 24 to retard such counter-clockwise rotation. It will be further appreciated that the unit 1, together with the control means therefor shown in Fig. 3 is adapted to be used not only as a transmission to drive the shaft 12, but also as a brake for said shaft through manipulation of the same control valve 56 which controls the speed of the transmission. This feature is unique and the present device is believed to be the first to embody the same.

Referring now to Figs. 6 to 10, these figures illustrate a modified form of rotor of laminated plate construction. The rotor here shown is generally identified by the numeral 65 and comprises a central circular plate 66, which may be formed of steel or other strong material. The plate 66 is flat on both sides and is provided with eight equally spaced circular openings 67, for a purpose to be described later, and a central opening 68 for mounting the same upon a shaft 69. Rotor plates 70 and 71 of similar configuration are disposed upon opposite sides of plates 66, but in reversed relation. The plates 70 and 71 are provided with recesses 70′ and 71′, respectively, which are similar in configuration to the recesses 28 and 28′, previously described. The plate 70 has four shouldered stud shafts 72 mounted thereon which have shoulders engaging one side of the plate 66 and a reduced shank that projects through one of the openings 67 in the plate 66 and into a threaded opening in the plate 70. These studs serve as pivots for vanes 73 (only one of which is shown in Fig. 9) disposed in the recesses 71′ of the member 71. Likewise, the plate member 71 has four similarly mounted stud shafts 72′ projecting from the side thereof adjacent the plate 66 to serve as pivots for vanes 73′ (only one of which is shown in Fig. 10) disposed in the recesses 70′. It will be apparent from Fig. 8 that the shanks of the studs 72 project through four of the openings 67 in the plates 66, and that the shanks of the stud 72′ project through the remaining openings in said plate, the shoulders of said studs engaging opposite faces of the plate 66 so that the three elements 66, 70 and 71 are tightly secured together and positively prevented from rotating relative to each other.

It is to be understood that the plate 66 has a width equal to that of the central portion 22 of the rotor 13 and cooperates with the rib 21 on the central section 2 of the housing in the same manner as the rotor portion 22. Moreover, the overall width of the laminated rotor 65 shown in Fig. 8 is such as to provide the same clearances with the end plates 3 and 4, as are provided between the sides of the rotor 13 and the inner faces of said end plates. The principal advantage of the rotor shown in Figs. 6 to 10, over the one-piece rotor shown in Figs. 2, 4 and 5 is that it is cheaper to manufacture.

It will also be understood that the rotors disclosed may be provided with a single set of vanes when the unit is to operate unidirectionally, or with two sets of vanes extending in the same direction in cases where unusually powerful torque is desired in a unidirectional drive.

It will be understood that various changes may be made in the details of construction of the parts of the unit disclosed herein without departing from the principles of the invention or the scope of the annexed claims.

I claim:

1. In a hydraulic power transmission system operated by fluid under pressure, a casing; a reversible power transmission unit mounted within said casing, said unit including a housing; a shaft extending through said housing and through the housing of said power transmission unit; a rotor secured to said shaft and located within the housing of said power transmission unit; vanes mounted on opposite sides of said rotor with the vanes on one side of the rotor extending in a direction opposite to that of the vanes on the opposite side of the rotor, said housing having working chambers for said vanes and inlet openings for admitting operating fluid into said chambers to act upon the vanes at either side of said rotor, and exhaust ports for discharging spent operating fluid into said casing; a fluid distribution valve mounted within said casing and having an inlet port for the operating fluid, said valve comprising a body having ports in communication with the inlet openings at the opposite sides of said housing, and a ported member in said valve body movable to bring its ports selectively in register with the ports of the valve body for selectively directing the flow of operating fluid to the inlet ports at one side or the other of said housing; a control valve between the source of fluid under pressure and the fluid-distribution valve to control the rate of supply of operating fluid to said power transmission unit to thereby control the speed of said unit; bypass conduits between said control valve and casing, said control valve having ports for bypassing some operating fluid from the source of fluid under pressure through said bypass conduits to said casing and from the fluid-distribution valve through said bypass conduits to said casing while said control valve is positioned to supply operating fluid to said unit, whereby upon adjustment of said distribution valve to reverse the direction of operating fluid while said rotor is turning, a braking action may be gradually applied to the rotor.

2. A fluid actuating device, comprising: an annular housing section; an end housing section on opposite sides of said annular housing section and cooperating therewith to form a rotor chamber; means extending through said sections and securing the same together, each of said end housing sections having a hub portion projecting outwardly therefrom; a shaft rotatably mounted in said hub portions and extending through said chamber; a rotor in said chamber fixed to said shaft, said rotor having side faces confronting the inner faces of said end housing sections with only close operating clearance therebetween; vanes pivotally mounted in recesses formed in one side face of said rotor, said annular housing section having portions of the internal periphery thereof removed to provide circumferentially spaced working chambers for said vanes; means for admitting operating fluid under pressure into said chambers; and means positively controlling the pivotal movement of said vanes relative to said working chambers as said rotor rotates.

3. A fluid actuated device, comprising: an annular housing section; an end housing section on opposite sides of said annular housing section and cooperating therewith to form a rotor chamber; means extending through said sections and securing the same together, each of said end housing sections having a hub portion projecting outwardly therefrom; a shaft rotatably mounted in said hub portions and extending through said chamber; a rotor in said chamber fixed to said shaft, said rotor having side faces confronting the inner faces of said end housing sections with only close operating clearance therebetween, said rotor having a central peripheral portion having only operating clearance with the inner surface of said annular housing section; vanes pivotally mounted in recesses formed in the opposite side faces of said rotor, said annular housing section having portions of the internal periphery thereof removed to provide working chambers for said vanes; means for admitting operating fluid under pressure into the working chambers at the sides of said annular housing section; and means positively controlling the pivotal movement of said vanes relative to rotor working chambers as said rotor rotates.

4. A fluid actuated device as defined in claim 3 in which the vanes on the one side of the rotor extend in one direction and the vanes on the opposite side of the rotor extend in the opposite direction and the operating fluid is selectively admissible to act on the vanes at either side of said rotor, whereby the device is rendered reversible.

5. A fluid actuated device, comprising: an annular housing member; and a pair of end plates, one on each side of said housing member and cooperating therewith to form a rotor chamber; a rotor in said chamber substantially filling said chamber and having side faces confronting the inner faces of said end plates with only close operating clearance therebetween, said housing member having a rib projecting inwardly therefrom at the central portion thereof and having lateral extensions of said rib projecting in opposite directions toward said end plates at diametrically opposed regions of said member, said rotor having a central, circumferentially uninterrupted peripheral portion having a close running fit with the inner periphery of said rib of said housing member, said rotor further having a plurality of recesses extending inwardly from the periphery and side faces thereof on opposite sides of said central peripheral portion; a stud projecting from said central portion into each recess; a vane in each recess pivotally mounted on the stud associated with the recess; a cam follower carried by each vane; and a cam track formed in the inner face of each end plate and receiving therein the cam followers of the vane confronting the respective end plates, said housing member having an inlet pocket formed therein disposed to one side of each lateral extension and having an exhaust passage on the other side of said extensions, and each of said end plates having inlets for operating fluid disposed in registration with the inlet pockets of said housing member.

6. A fluid actuated device as defined in claim 5, in which the inlet ports and exhaust passages at one side of the annular housing section are substantially 90 degrees out of registration with the inlet ports and exhaust passages on the opposite side of said housing section.

7. A rotor having a circumferentially continuous peripheral portion and recesses in at least one side face thereof; a stud in each recess projecting in a direction parallel to the axis of the rotor; a vane in each recess pivotally mounted upon the stud therein, each vane having an extension spaced from said stud and located within its associated recess; and a cam follower mounted on each extension.

8. A rotor as defined in claim 7, in which the vanes are of a depth substantially equal to the depth of the recesses and the cam followers are disposed in a plane adjacent said face of said rotor.

9. A one-piece rotor having a circumferentially uninterrupted peripheral portion, said rotor having a plurality of recesses extending inwardly from the periphery thereof and from one face of said rotor on at least one side of said circumferentially uninterrupted peripheral portion, and a stud projecting from said central portion into each recess; and a vane in each recess pivotally mounted on the stud associated with the recess and a cam follower carried by each vane.

10. A rotor comprising: a central circumferentially continuous portion; studs projecting on the opposite sides of said central portion; means on the opposite sides of said central portion providing peripheral recesses in the region of said projecting studs; a vane in each recess pivotally mounted upon a stud, each vane having an extension spaced from said stud and located within its associated recess; and means carried by each extension for actuating the same.

11. A rotor comprising: a central circular plate and a pair of side plates, one on each side of said circular plate, each of said side plates having a plurality of circumferentially spaced recesses formed therein and extending inwardly from the periphery thereof and completely across said side plates, and stud means extending from said central plate into the respective recesses of said side plates.

12. A rotor comprising: a central circular plate and a pair of side plates, one on each side of said circular plate, each of said side plates having a plurality of circumferentially spaced recesses formed therein and extending inwardly from the periphery thereof and completely across said side plates, each of said side plates also having a plurality of studs extending therefrom and through openings in said central plate and into one of the recesses of the other side plate; and a vane pivotally mounted in each recess on the stud projecting thereinto.

13. A rotor as defined in claim 12, in which the studs carried by the respective side plates have a shoulder engaged with one face of said circular plate and have a reduced portion which extends from the shoulder through an opening in the central plate and into a threaded opening in one of the side plates, whereby the studs secure the central and side plates together.

14. A fluid actuated device, comprising: a housing having a rotor chamber therein, said housing having a hub portion projecting outwardly therefrom on opposite sides thereof; a shaft rotatably mounted in said hub portions and extending through said chamber; a rotor in said chamber fixed to said shaft, said rotor having side faces confronting the inner faces of said housing with only close operating clearance therebetween; vanes pivotally mounted in recesses formed in one side face of said rotor, said housing having portions of the internal periphery thereof removed to provide working chambers for said vanes; means for admitting operating fluid under pressure into said chambers; and means positively controlling the pivotal movement of said vanes relative to said working chambers as said rotor rotates.

References Cited in the file of this patent

UNITED STATES PATENTS

| | | |
|---|---|---|
| 510,600 | Hochhausen | Dec. 12, 1893 |
| 1,138,481 | Hupe | May 4, 1915 |
| 1,358,168 | McCutchen | Nov. 9, 1920 |
| 1,615,341 | Murray | Jan. 25, 1927 |
| 1,953,029 | Smith | Mar. 27, 1934 |
| 2,030,257 | Hume | Feb. 11, 1936 |
| 2,719,512 | Kovach | Oct. 4, 1955 |
| 2,720,191 | Vas | Oct. 11, 1955 |

FOREIGN PATENTS

| | | |
|---|---|---|
| 648,913 | France | Aug. 21, 1928 |